(No Model.)  R. N. ALLEN.  2 Sheets—Sheet 1.
CAR WHEEL.
No. 351,481.  Patented Oct. 26, 1886.
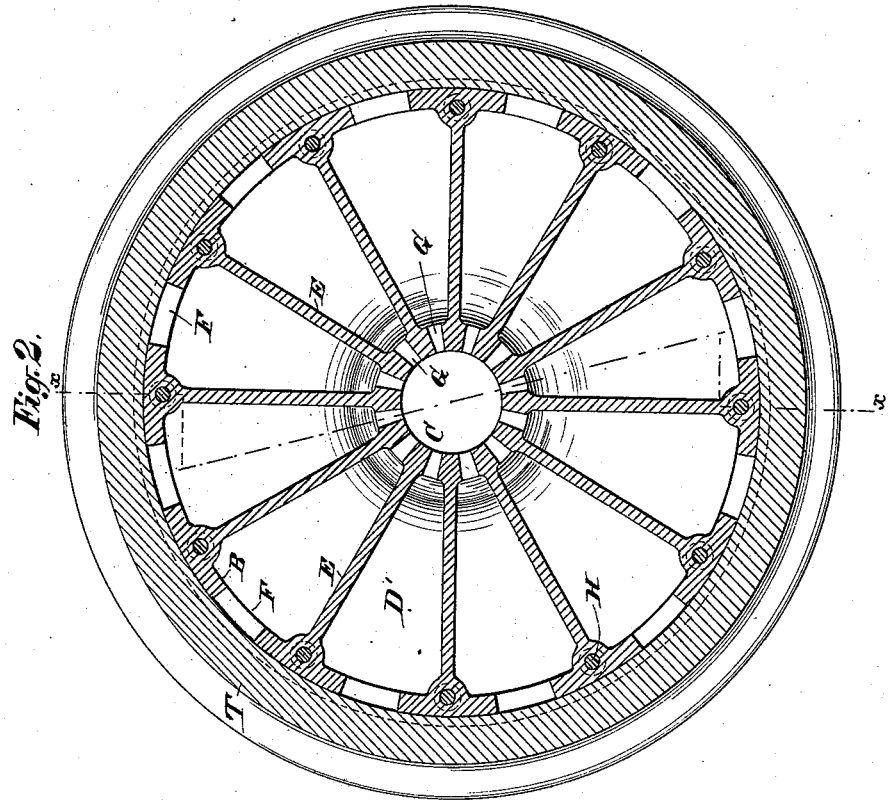
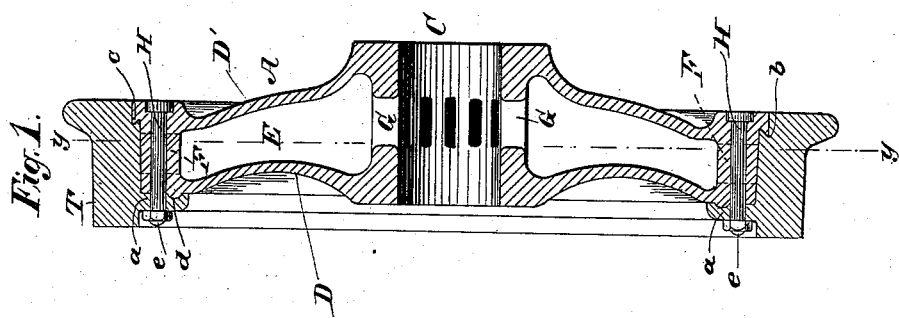
Witnesses:
Robt. F. Gaylord
Robt. H. Duncan
Inventor
Richard N Allen (No Model.) 2 Sheets—Sheet 2.

R. N. ALLEN.
CAR WHEEL.

No. 351,481. Patented Oct. 26, 1886.

Witnesses:
Robt. F. Gaylord
Robt. H. Duncan

Inventor
Richard N. Allen

UNITED STATES PATENT OFFICE.

RICHARD N. ALLEN, OF CLEVELAND, OHIO.

CAR-WHEEL.

SPECIFICATION forming part of Letters Patent No. 351,481, dated October 26, 1886.

Application filed July 2, 1886. Serial No. 206,905. (No model.)

*To all whom it may concern:*

Be it known that I, RICHARD N. ALLEN, of the city of Cleveland, in the county of Cuyahoga and State of Ohio, have invented a new and useful Improvement in Car-Wheels, of which the following is a specification.

The present invention relates to that class of car-wheels in which the body or central part of the wheel is cast in a single piece; and the invention consists, generally, in the arrangement of the metal composing the body of the wheel, so as to combine great strength and durability with the desired lightness, substantially as hereinafter described. The invention also consists in the combination, with such body, of a removable tire.

In the manufacture of car-wheels from cast metal it is desirable to so dispose the metal as to give the requisite strength with the least weight of material; and the objects of this invention are to produce a car-wheel body which shall combine strength and durability with lightness, and at the same time shall be of such construction that the tire can be securely united thereto, but by such means that it can be readily removed therefrom, if desired, and a new tire be substituted.

A car-wheel containing my invention is illustrated in the accompanying drawings, in which—

Figure 3:
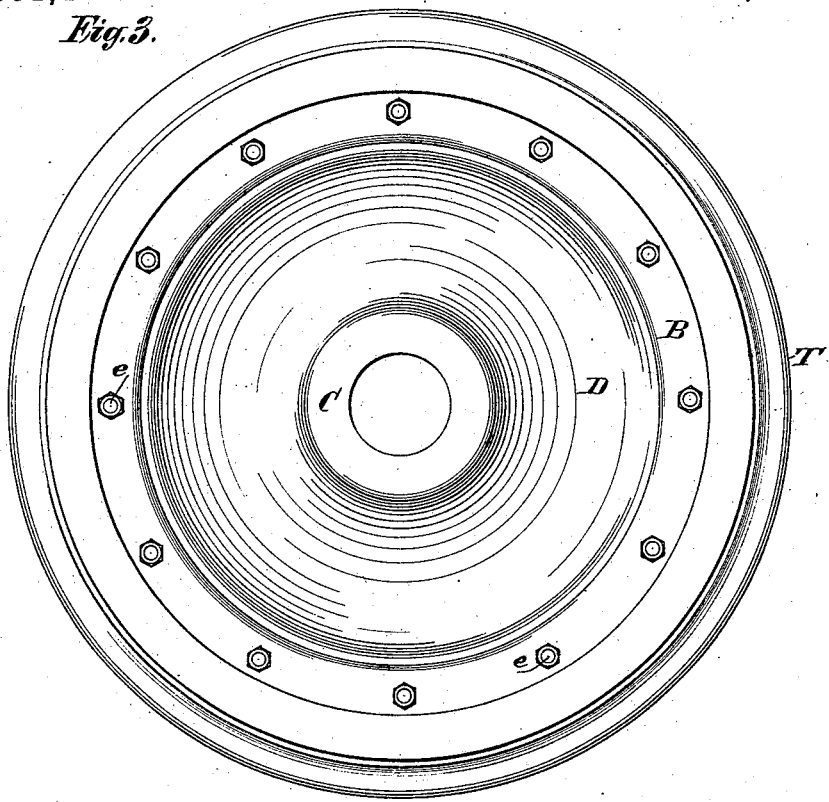
Figure 4:
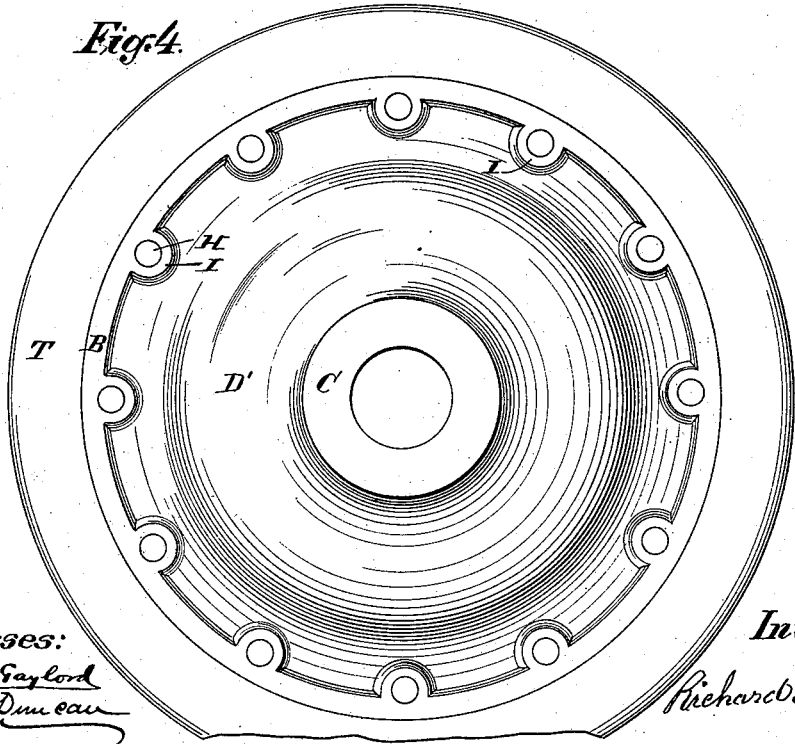

Figure 1 is a central cross-section of a car-wheel containing my invention, taken through the line *x x* of Fig. 1. Fig. 2 is a section through the line *y y* of Fig. 1. Fig. 3 is an elevation of the outer face or side of the wheel, and Fig. 4 is an elevation of the inner side thereof.

In the drawings, A represents the body or central part of the wheel, which, although formed in a single piece, may for the purposes of description in this application be regarded as composed of the following-named parts: The rim B, on which the tire rests, the hub C, the side plates, D and D', and the cross webs or ribs E, which latter, extending between the side plates from the rim to the hub, divide the interior of the body into a series of chambers radiating from the hub to the rim.

T represents the tire.

The body A is cast, preferably from iron or steel, in a single piece. This can be practically done by forming a divided mold or matrix corresponding generally with the outer surface of the body, and placing in the space between the matrix of the rim and the hub a series of cores of such shape and so located relatively to each other as to form matrices for the cross-webs E and the interior surfaces of the side plates, the rim, and the hub. A prepared core corresponding in size and shape with the axle-space preferably forms the center of the mold. These cores can be correctly placed in the mold, and retained in their proper positions during the casting by forming matrices for their ends in the mold by means of projections or "prints" attached to the pattern. For each of the web-cores these prints are attached to the rim of the pattern and project beyond it; for the central or axle-space core the prints are preferably attached to both sides of the pattern. The cores, previously formed or molded of the proper material and to the required size and shape, are placed in their respective positions in one part of the divided mold, the axle-space core having one of its ends resting in the matrix of its print. The inner ends of the web-cores may be inserted into mortises or holes formed in the axle-space core, or may be secured to such core by any other means, while their outer ends will rest in the matrices of their prints formed in the mold beyond the matrix of the rim. When the parts of the flask containing the divided mold are closed and secured together, the web-cores, by the clamping of their outer ends in the closed flask, and by the attachments of their inner ends to the axle-space core, are securely held in position to prevent them from sagging and to permit the metal to flow freely around them to form the adjacent body of the wheel. The parts of the cores which extend through the matrix of the rim and the hub may be of any desired shape and size which will enable the cores to be held in place, and will produce apertures through which the cores can be conveniently expelled after the casting is made without seriously affecting the strength of the body. The apertures F in the rim, and G in the hub, (shown in Figs. 1 and 2 of the drawings,) are of convenient size and shape to permit of the ready breaking up and expulsion of the cores by a tool inserted and worked through the apertures F, without, however, essentially weakening those parts of the body where strength is especially desired.

I am aware that it has been proposed to cast car-wheels in a single piece provided with a hollow space extending from the hub to the tire. In such cases, however, the sides, one or both, of the wheel forming the walls of the hollow space, were provided with openings for the expulsion of the casting-cores, and these openings detracted from or diminished the strength of the wheel.

I am also aware that it has been proposed to cast car-wheel centers in a single piece with a hollow space adjacent the hub and another hollow space adjacent the rim, separated by a wall running circumferentially around the center, and that in this construction apertures were shown in the hub and rim for the removal of the core-sand. Such centers were not, however, provided with cross webs or ribs extending from the rim to the hub and dividing the interior space into radial chambers, like my centers, but they were divided into two circumferential chambers, with the result that the cores which filled either of these chambers in the casting-mold could not be supported at both of their ends, as is the case in my construction where the chambers are continuous from the rim to the hub. So, also, in the centers above referred to, the apertures through the hub could not be availed of in the removal of the core from the chamber adjacent the rim, nor could the apertures through the rim cooperate in the removal of the core from the chamber next the hub, while in my centers a tool inserted in the rim-apertures can be worked to break up and remove the cores through the apertures of the hub with far greater ease and facility than if they could only be removed through the apertures in which the tool was inserted.

It is readily seen that the interior construction of my center is widely different from that provided with the two circumferential chambers, especially in being provided with a series of cross webs or ribs which brace and strengthen the sides of the finished center from the hub to the rim.

The tire T may be secured to the body A by any practical means. It is preferred to unite the tire to the rim of the body by such means that it can be easily removed and a new one substituted, and such means are shown in the drawings, in which the tire is provided with a web, $a$, projecting inwardly from the under side, and located near its outer edge. The inner edge of the tire is provided with a groove, $b$, and the adjacent edge of the rim B of the body of the wheel is provided with a corresponding tongue or projection, $c$. The tire is forced into place upon rim B, the latter being preferably first turned down smooth, the tongue $c$ being entered into its groove $b$, and the web $a$ being preferably made to conform to the edge of the rim adjacent thereto. For additional security, a tongue-and-groove lock, $d$, may be formed between the web and the adjacent edge of the rim. A series of bolts, H, having their heads preferably counterbored in bosses I, are passed through the rim B and the web $a$, and are drawn home and held in place by nuts $e$. The two tongue-and-groove locks and the series of bolts give a very secure and safe union of the tire to the body of the wheel, and permit the removal of the tire by simply removing the bolts and forcing it off, without injury to the body of the wheel. I do not, however, wish to limit this invention to the special means described and shown of securing the tire to the body of the wheel, as it is evident that the tire can be secured by other means; nor do I wish to limit the invention to a car-wheel whose tire is secured to the body by such means that it could be removed without injury to the body, as it is evident that the body of the wheel may be of substantially the construction described and shown, and the tire be secured to the body in such manner that it could not be removed without destroying the body.

The invention is, primarily, for a car-wheel body, having substantially the construction described, irrespective of the manner in which the tire is or may be secured thereto; secondly, for a car-wheel composed of a hollow center or body, with continuous or unbroken sides and perforated rim, and a tire fitted over such perforated rim; and, thirdly, for the method of casting hollow car-wheel centers or bodies in a single piece, with continuous or unbroken sides, all as hereinbefore described and herinafter claimed.

What is claimed as new is—

1. A car-wheel center or body cast in a single piece and provided with continuous or unbroken sides joined by cross webs or ribs extending from the rim to the hub and dividing the interior into a series of radial chambers, substantially as and for the purpose described.

2. A car-wheel composed of a body or central part cast in a single piece and a tire, the body being provided with continuous or unbroken sides joined by cross webs or ribs extending from the rim to the hub and dividing the interior into a series of radial chambers, each having apertures extending through the rim, and the tire being fitted upon the rim of the body to cover its apertures and form a continuous metal tread, substantially as set forth.

3. The herein-described method of casting car-wheel bodies or centers having continuous or unbroken sides joined by cross webs or ribs extending from the rim to the hub and dividing the interior into a series of radial chambers, which consists in arranging in the casting mold cores corresponding with the radial chambers of the body and holding such cores in position during the casting by means of radial projections or core-prints, supported at one end of the core in the axle-space and at the other end beyond the rim-space of the mold, whereby the body is cast in one piece, and apertures for the removal of the cores from the cast body are provided through the rim and the hub, and the sides of the body are made continuous or unbroken.

RICHARD N. ALLEN.

Witnesses:
ROBT. H. DUNCAN,
ROBT. F. GAYLORD.